Patented June 9, 1931

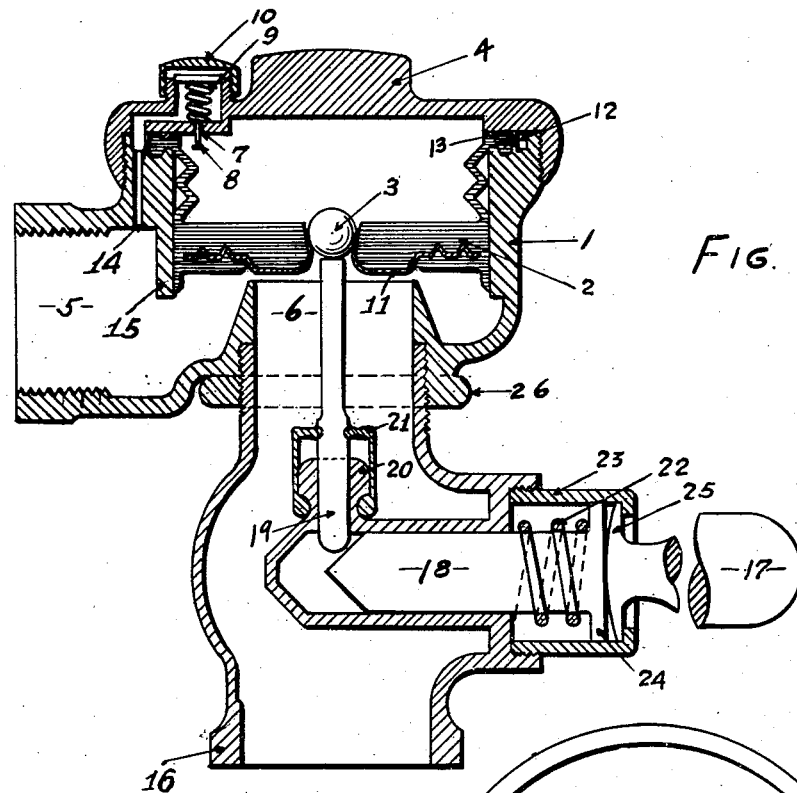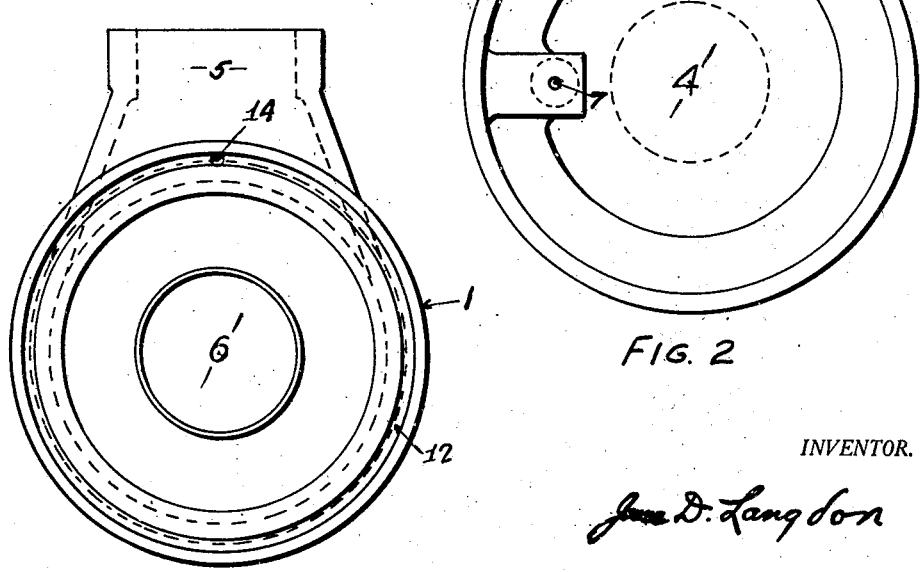

1,808,989

UNITED STATES PATENT OFFICE

JESSE D. LANGDON, OF LOS ANGELES, CALIFORNIA

FLUSH VALVE

Application filed November 8, 1927. Serial No. 231,915.

This invention has for its object, broadly, to provide a flush valve of few and simple parts, so that it may be manufactured economically and may be conveniently assembled, and not be liable to the usual faults inherent in valves of other types included in the art.

One of the specific objects of the invention is to provide a novel and improved valve member moved by fluid pressure.

A further object is to provide a valve member having novel means for accommodating a relief valve element.

A further object is to provide a valve member having metal and resilient portions to contact with a valve seat in order to effectively prevent leakage.

A further object is the provision of novel means for opening the relief valve element.

Still another object is the provision of a valve of the kind indicated having a by-pass provided with means for preventing the clogging thereof.

Another object is the provision of a cap for the valve body having the by-pass therein.

Further objects will appear as the description proceeds.

The invention consists of the novel construction, combination and arrangement of parts as described and claimed, and as illustrated by the accompanying drawings, wherein,—

Figure 1 is a median section of the valve, portions being shown in elevation.

Fig. 2 is a bottom plan view of the cap.

Fig. 3 is a plan view of the valve body with the cap removed.

The valve body 1 provides a cylinder in which the valve member 2 is movable. Said valve member is of cup-shape and is composed of rubber or other flexible material. The bottom portion of the cup-shaped member 2 is thick to provide a piston movable in the cylinder portion of the body 1 and the wall of the member 2 is of bellows formation to fold and unfold when the piston portion of the member 2 is moved upwardly and downwardly.

A sheet metal plate 11 has its outer edge portion embedded in the piston of the valve member 2, and has a central neck fitted within a central opening in the piston and providing a seat for a relief valve ball 3. The portion of the plate 11 between the neck and outer edge portion is disposed below the piston to engage the annular valve seat 6 which rises from the bottom of the body 1.

The valve seat 6 is tapered to a substantially sharp edge so as to contact with the metal plate 11 and the rubber or other flexible material, with a wedging action of the seat between the metal and flexible material so as to provide a tight fit. The plate 11 provides a bevelled metal contact with the inner edge of the valve seat, while the flexible material contacts with the outer edge of said seat, to provide a double closure.

A cap 4 is screw-threaded on the body 1 and clamps the outturned rim of the valve member 2 on the body. A friction ring 13 is clamped between said rim and the cap 4, and said rim provides a sealing gasket between the body and cap.

The body 1 has an inlet 5 and a by-pass passage 14 leading from said inlet to the rim of the body which is formed with an annular groove 12 with which said passage communicates. The cap 4 has a by-pass 7, one end of which registers with the groove 12 and the other end of which opens into the valve member 2, so that the fluid flowing through the passage 14 and by-pass 7 to the valve member will move the piston of said member downwardly against the seat 6.

A needle 8 is slidable in the end of the by-pass 7 which communicates with the valve member, and has a piston working in an extension of the by-pass, with a spring 9 confined under the piston, so that the fluid flowing through the by-pass will vibrate the needle in order to keep the inner end of the by-pass open and to prevent same from being clogged. A cap 10 is threaded on the cap 4 over the needle 8 and by-pass to permit access thereto.

The body 1 has an apron forming a part of the cylinder in which the valve member 2 is movable, but the water passage below said apron is of sufficient area so as not to impede the flow of water when the valve member 2 is moved upwardly to open position.

An outlet member 16 is screw-threaded into the bottom of the body 1 below the valve seat 6, and said member and body are prevented from separating by a binding nut or collar 26 threaded on the member 1 and seating against the body.

The member 16 has a guide 20 therein in which a plunger 18 is slidable radially of the axis of the valve member 2, and the inner end of said plunger is conical and contacts with the lower end of a vertical plunger 19 arranged in the axis of the valve member 2. The lower portion of the plunger 19 is slidable in the guide 20 and its upper end is arranged to contact with the ball 3. A sealing member 21 of rubber or other elastic material embraces the plunger 19 and guide 20 to prevent the fluid escaping through said guide.

The plunger 18 has a flange 24 at its outer end movable within a member 23, and a spring 22 is confined between the flange 24 and member 16 for retracting the plunger 18.

A handle 17 has a cam flange 25 mounted within the member 23 so that when the handle is swung in any direction, the flange 25 is swung inwardly to push the plunger 18 inwardly, and its inner conical end contacting with the plunger 19 will raise said plunger so as to unseat the ball 3.

In operation, the movement of the handle 17, therefore, will unseat the ball 3 and permit the fluid to flow through the opening of the valve member 2, thereby relieving the pressure within said valve member, so that the pressure of the fluid against the lower surface of the valve member will raise and unseat said valve member, thereby establishing the flow of fluid from the inlet 5 through the outlet member 16.

The ball 3 being again seated will prevent further flow of fluid from the valve member, and the fluid passing through the passage 14 and by-pass 7 will gradually move the piston of the valve member downwardly so as to seat the valve member and shut off the flow through the valve.

It is understood that the illustrations are for the purpose of description only and that details may be changed, and changes in form, size and proportions may be made, within the scope of the invention, which has been fully described, including that which is new, and upon which I claim:

1. A valve comprising a body having a seat, and a valve member of flexible material movable in the body and having a metal plate partly embedded in said material, said plate and flexible material being both arranged to contact with said seat.

2. A valve comprising a body having a seat, a valve member of flexible material working in said body, and a metal plate partly embedded in said member, said seat being adapted to have a wedging engagement between said plate and the flexible material.

3. A valve comprising a body having a seat with a narrow edge portion, a valve member of flexible material movable in the body, and a sheet metal plate having its marginal portion embedded in said member and having an exposed portion to contact within said seat, the flexible material being adapted to contact with said seat simultaneously with said plate.

4. A valve comprising a body having a seat, a valve member of flexible material movable in the body and having an opening and a metal plate partly embedded in said material and having a seat portion in said opening, said plate and flexible material being both arranged to contact with said seat, and a valve element seatable on said portion.

5. A valve comprising a body having a seat, a valve member of flexible material working in said body, a metal plate partly embedded in said member, said seat being adapted to have a wedging engagement between said plate and the flexible material, said member having an opening, the plate having a seat portion entering said opening, and a valve element seatable on said portion in said opening.

6. A valve comprising a body having a seat with a narrow upper edge portion, a valve member of flexible material movable in said body, and a sheet metal plate having its outer end embedded in said member, and its inner portion covering the under surface of the valve member, said inner portion and the flexible material being adapted to contact with the narrow edge portion of said seat simultaneously.

In testimony whereof I have signed my name to this specification.

JESSE D. LANGDON.